United States Patent [19]
Bertha

[11] Patent Number: 4,874,429
[45] Date of Patent: * Oct. 17, 1989

[54] HYDROMETALLURGICAL PROCESS FOR THE RECOVERY OF SILVER FROM COPPER ELECTROLYSIS ANODE SLUDGE

[75] Inventor: Josef Bertha, Brixlegg, Austria

[73] Assignee: Austria Metall Aktiengesellschaft, Braunau am Inn, Austria

[*] Notice: The portion of the term of this patent subsequent to May 19, 2004 has been disclaimed.

[21] Appl. No.: 116,595

[22] Filed: Nov. 2, 1987

[30] Foreign Application Priority Data

Oct. 31, 1986 [AT] Austria .................................. 2906/86

[51] Int. Cl.⁴ ......................................... C22B 11/04
[52] U.S. Cl. ................................. 75/118 R; 75/103; 75/109; 75/112; 75/114; 75/117; 75/119; 75/120; 75/121
[58] Field of Search ...................... 423/22, 38, 39, 40, 423/42, 46, 92, 94, 103, 109, 163, 140, 150, 508, 509, 510; 75/97 A, 101 R, 108, 109, 111, 112, 114, 117, 118 R, 119, 120, 121

[56] References Cited

U.S. PATENT DOCUMENTS

| | | | |
|---|---|---|---|
| 2,060,539 | 11/1936 | Spies | 75/108 |
| 3,594,157 | 7/1971 | Hendrickson et al. | 423/43 |
| 3,658,510 | 4/1972 | Hoffmann et al. | 75/99 |
| 4,094,668 | 6/1978 | Yannopoulos et al. | 75/99 |
| 4,342,592 | 8/1982 | Lamb | 423/38 |
| 4,372,782 | 2/1983 | Salter et al. | 75/118 R |
| 4,439,235 | 3/1984 | Simpson | 75/101 R |
| 4,666,514 | 5/1987 | Bertha | 423/508 |

Primary Examiner—Robert L. Stoll
Attorney, Agent, or Firm—Herbert Dubno

[57] ABSTRACT

Silver is recovered from an anode sludge by initially chlorinating the sludge in a slurry with nascent chlorine. The nascent chlorine is produced in situ by addition of sodium hypochlorite to the slurry in hydrochloric acid. Then the slurry is filtered and the silver containing solid phase extracted with ammonia to produce a solution from which lead is precipitated. The filtrate is then reacted with copper to precipitate silver.

6 Claims, 1 Drawing Sheet

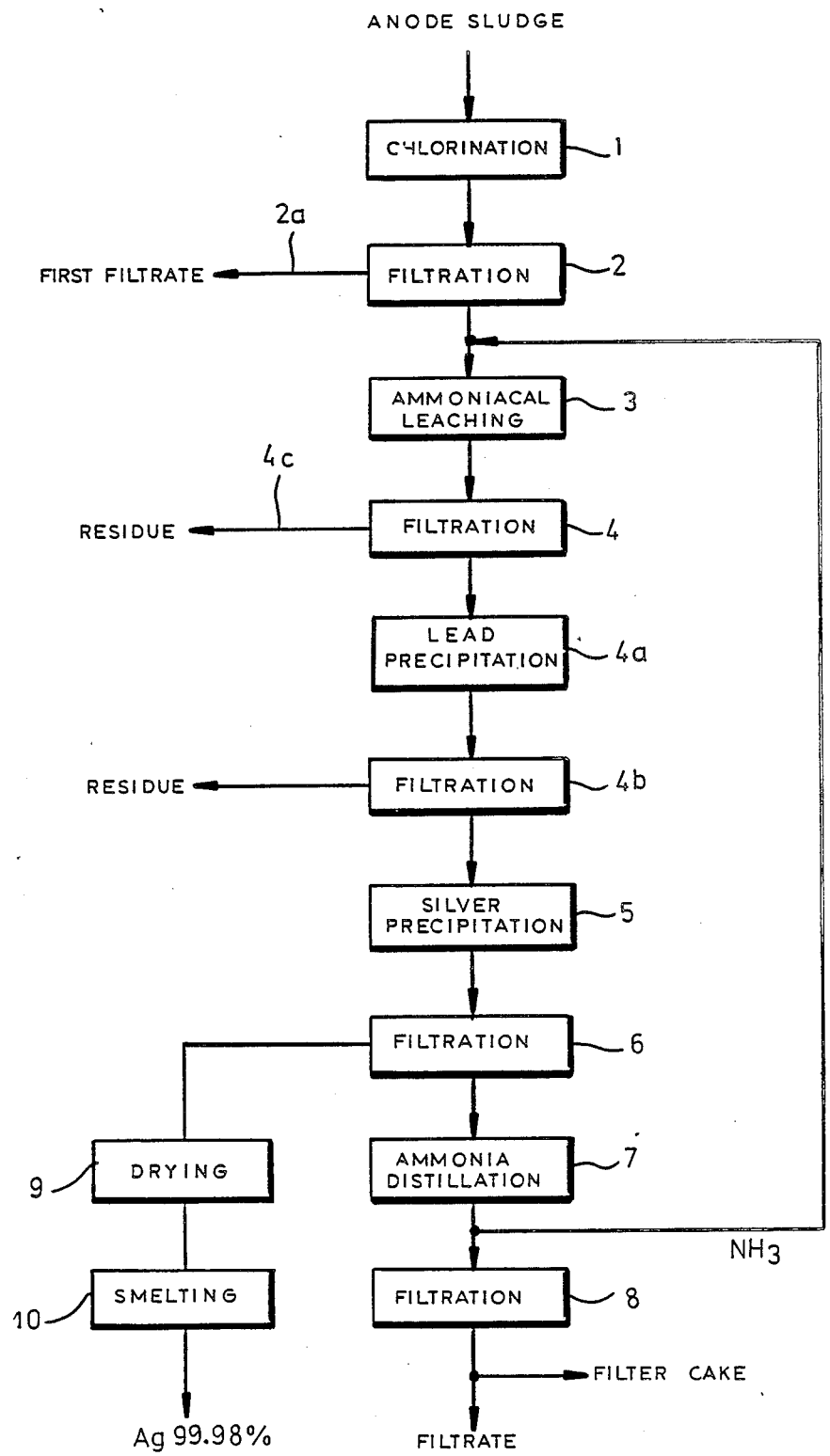

HYDROMETALLURGICAL PROCESS FOR THE RECOVERY OF SILVER FROM COPPER ELECTROLYSIS ANODE SLUDGE

FIELD OF THE INVENTION

My present invention relates to a hydrometallurgical process for the treatment of anode sludges from copper electrolysis and similar raw materials which contain, in addition to silver, one or more of the elements lead, gold, platinum-group metals selenium, tellurium, antimony, tin, arsenic, bismuth, copper, nickel, zinc, iron and sulphate, chloride and silica among others.

BACKGROUND OF THE INVENTION

In the anode sludge which results from the electrowinning of copper and the electrolytic refining of copper, there are present varying amounts, depending upon the source of the anode, of silver, gold, platinum, palladium, selenium, tellurium, arsenic, antimony, copper, nickel, lead, etc. The main purpose of a treatment of the anode sludge is, therefore, the separation and recovery of valuable materials therefrom. Various methods have been proposed for this purpose in the past.

In the usual processes, the sludge is pyrometallurgically treated with a flame in the drive hearth process and the resulting anode silver is further electrochemically treated.

This process has a number of significant drawbacks. It is especially labor intensive and energy intensive and it is necessary to use slag charges which take up much of the noble metals and require separate processing of the slags to recover the noble metals.

More recently, processes combining wet chemical and pyrometallurgical process steps have been described.

For example, U.S. Pat. No. 4,002,544 and German Patent Document DE-AS 2543027 describe a process in which decoppered anode sludge is subjected to a sulfidizing roasting step at about 160° C. to 300° C. to decompose the copper and silver selenides and tellurides. The product is then leached with hot sulfuric acid in which about 95% of the silver, selenium and tellurium are dissolved.

From the filtered salt sludge, nickel is leached by hot water and the residual sludge is treated by other conventional processes to recover the gold, platinum and palladium.

After dilution of the sulfuric acid filtrate, the silver, selenium and tellurium are cathodically recovered by electrolysis and the resulting metal powder is smelted with a supply of air during the smelting process to volatilize the selenium and tellurium as the respective oxides. The metal is then supplied as anode silver to a silver electrolysis stage. This process avoids the smelting treatment in the flame furnace but it requires an additional electrolysis step for the separation of the silver, selenium and tellurium. Aside from this, the sulfidizing roasting does not provide a precise separation of the components.

In another process described in German patent Document DE-As 146712, the anode sludge, freed from selenium and tellurium, is subjected to a treatment in which the silver, copper and lead are solubilized as the nitrates and are processed in a silver electrolysis step. From the sludge residue the total gold, platinum and palladium are recovered by one of the standard pyrometallurgical or hydrometallurgical processes.

The silver contained in the nitric acid solution is predominantly recovered by an electro-winning process and the remaining silver can be recovered by cementation with copper. From the desilvered solution the lead is precipitated with sulfuric acid and the lead sulfate and is filtered off. The filtrate, for separation of the nitric acid and sulfuric acid, is distilled and rectified and the crystallization residue in the sump of the still is dissolved in water and worked up to recover copper or copper salts.

When palladium is present in the anode sludge, this process is not suitable because palladium is largely soluble in nitric acid and a separate step for recovery of this valuable metal must be carried out.

A further disadvantage is that the high palladium and copper contents can require very costly electrolytic process which may make the overall process completely uneconomical.

Another process which requires consideration (see German Patent Document DE-OS 2117513) provides direct chlorination of the anode sludge from which lead has previously been separated.

The anode sludge is mixed with dilute hydrochloric acid to form a low viscosity slurry and during agitating gaseous chlorine is introduced at a temperature of about 100° C. With the exception of silver, the chlorination results in the solubilization of all of the materials in the sludge. The slurry is then hot filtered and hot washed to remove the principal proportion of the lead as the lead chloride.

The silver chloride is then extracted with ammonia to separate silver from the residual accompanying elements antimony, tin and silica. The recovery of silver from the ammonical solution is effected by evaporating the ammonia leaching silver chloride precipitate with sodium hydroxide, reducing the resulting $Ag_2O$ with reducing sugars to a pure powdered silver metal and smelting the latter powder.

A drawback of the use of chlorine gas in a solution which can have a normality of 12N of hydrochloric acid, corresponding to 432 g of a hydrogen chloride per liter at 100° C. is that the process may be dangerous and creates corrosion problems. It requires reflux cooling for the hydrogen chloride vapors and creates problems with the separation of the $PbCl_2$ from the sludge because of the temperature drop in the filter press and the plugging of the pipe lines associated therewith. A precise separation of the lead and silver is not possible.

The German Democratic Republic Patent No. 201,920 describes the leaching of gold and silver from the silver ores with low noble metal contents using aqueous sodium chloride solutions (200–250 g/l). The ore either before leaching or during leaching is aerated possibly in conjunction with the addition of $Cu^{++}$. This process can be supplemented by the addition of hypochlorite ions during the leaching when gold is present and the process is then carried out at a pH value above 4.

The oxidation is then effected by the hypochlorite ion which decomposes in this pH range into the chloride and oxygen in accordance with the relationship:

$$NaOCl \rightarrow NaCl + O$$

U.S. Pat. No. 4,439,235 also describes the leaching of ores utilizing said hypochlorite in which the leaching is effected by decomposing the ore with solutions which contain about 500 g of sodium hypochlorite per liter and about 20 ml of HCl/l. The addition of hydrochloric acid here serves only to set the pH value of the solutions at about 4 to 5. The oxidation is here accomplished by the decomposition of the sodium hypochlorite to the sodium chloride and oxygen as described.

There is no direct in situ generation of nascent chlorine gas in the slurry suspension described or suggested in this disclosure.

In EP-A10 176 100, the use of sodium hypochlorite to generate chlorine gas is exploited in that the sodium hypochlorite solution is introduced into a hydrochloric acid slurry which has previously been freed from acid soluble copper, nickel and lead.

Of course, this process requires a separate step for the removal of the copper, nickel and lead.

OBJECTS OF THE INVENTION

It is the object of this invention to provide an improved hydrometallurgical process for the treatment of copper electrolysis anode sludge or like materials for the recovery of silver in a high purity form, which will obviate the drawbacks enumerated above.

SUMMARY OF THE INVENTION

The present invention provides a hydrometallurgical process for the treatment of a copper-electrolysis anode sludge and like raw material which contains, in additon to silver, lead, and copper, one or more constituents selected from the group consisting of Au, platinum-group metals, Se, Te, Sb, Sn, As, Bi, Ni, Zn and Fe, sulfate ion, chloride ion and silica, comprising the steps of:

(a) slurrying the raw material with hydrochloric acid and introducing a sodium hypochlorite solution the resulting slurry to generate nascent chloride and chlorinate the raw material therewith;

(b) filtering the slurry to recover a first filtrate containing soluble chlorides of the constituents and a first solid filtered phase containing the silver of the raw material in the form of precipitated AgCl;

(c) extracting the first solid filtered phase with ammonia to recover an extract containing silver in solution in the form of $Ag(NH_3)_2Cl$ and dissolved lead;

(d) precipitating the lead from the extract and filtering same to form a second filtrate containing the $Ag(NH_3)_2Cl$;

(e) displacing silver from the second filtrate with at least one substance selected from the group consisting of $Cu^I$ compounds, copper powder and bronze dust to precipitate a silver powder at a temperature of at least room temperature and with agitation, and increasing the volume of the silver powder by adding to the second filtrate a flocculating agent;

(f) filtering the second filtrate to recover a silver-powder precipitate and an ammoniacal third filtrate;

(g) reacting the third filtrate with calcium hydroxide to liberate ammonia, and distilling off the liberated ammonia to recover same while producing a suspension;

(h) filtering the suspension to recover a filter cake which is subjected to metallurgical processing; and (i) smelting the silver-powder precipitate recovered in step (f) to obtain a high-purity silver product.

With the process of the invention, the anode sludge and like raw materials containing the listed constituents in addition to silver can be treated with the recovery of silver impurities of 99% and higher, and without prior treatment in advance of the recovery of the silver component and the associated cost.

BRIEF DESCRIPTION OF THE DRAWING

The sole FIGURE of the drawing is a flow diagram illustrating the process of the invention.

SPECIFIC DESCRIPTION

As can be seen from the drawing and as has been described above, the anode sludge, to decompose the highly stable selenides, tellurides and other compounds which are normally difficult to solubilize, is subject to a chlorination by the addition of concentrated sodium hypochlorite to the hydrochloric acid solution.

It has been found, surprisingly, in large scale testing that the removal of lead and the removal of copper from the anode sludge before the chlorination, and even the removal of acid soluble nickel is not necessary and the presence of these elements does not interfere with chlorination when the latter is carried out in the manner described.

By contrast with other processes which also involve a chlorination and which require removal of copper, nickel and lead, I make use of sodium hypochlorite which can be added in the form of a concentrated sodium hypochlorite solution to the cold hydrochloric acid slurry to generate directly at the inlet point of the sodium hypochlorite, chlorine in a nascent state which is unusually reactive and in a comparatively short time can split even the most stable compounds of selenium and tellurium and other metals into the soluble form. The reactions include:

$$NaOCl + 2HCl \rightarrow NaCl + Cl_2 + H_2O$$

$$Ag_2Se + 4H_2O + 4Cl_2 \rightarrow 2AgCl + H_2SeO_4 + 6HCl$$

$$(4H_2O + 4Cl_2 \rightarrow 8HCl + 4O)$$

The advantage of the invention over direct chlorination with chlorine gas supplied from the exterior is the fact that the chlorine gas which is generated in situ is the highly reactive nascent chlorine, but this does not pose a problem since it need not be handled, being generated directly by the use of the sodium hypochlorite which is easier to meter in the hydrochloric acid solution and has significant advantages over chlorine gas with respect to handling safety. environmental compatability and both capital and operating costs of the system.

A further improvement with respect to other chlorinating processes is that the chlorination processes of the invention can be carried out at temperatures as low as room temperature. After the filtration of the chlorinated suspension, one obtains a filtrate containing gold, palladium, platinum, selenium and tellurium which is further processed in a conventional way. That filtrate is the first filtrate mentioned previously.

The silver chloride containing filter residue, i.e. the first solid phase, is subjected to extraction, e.g. in the presence of a filter aid agent, using an ammonia solution at room temperature and with good agitation, thereby extracting the AgCl as $Ag(NH_3)_2Cl$. After filtration and washing, the filter cake can be returned to a shaft furnace for metallurgical processing. The extracting reaction operates in accordance with the formula $$AgCl + 2NH_3 \rightarrow Ag(NH_3)_2Cl$$

The second filtrate, depending upon the level of the lead content of the anode sludge, always contains small amounts of soluble lead (about 400 to 800 ppm). In the precipitation of the element silver, therefore, a small proportion of the lead could be precipitated with the silver and could contaminate it.

Accordingly, I provide a separate lead precipitation step in which the lead is precipitated from the solution with an appropriate precipitating agent, for example $PO_4^{---}$ or $CrO_4^{--}$. The precipitate is then filtered off and can be treated to recover the lead as desired by conventional means.

The third filtrate is thus a silver-containing lead-free filtrate which can be reacted in a gas-tight reactor with agitation with monovalent copper ion or with monovalent copper compounds, for example, CuCl or with copper powder or bronze dust, e.g. bronze dust containing 80% by weight copper and 20% by weight zinc. The $Ag^+$ is thus reduced in the ammoniacal solution to silver metal.

When copper powder or bronze dust is used the $Cu^{++}$ content of the $Ag^+$ solution is raised before precipitation by the addition of a $CuCl_2$ solution such that the $Cu^{++}$ content of the solution amounts to 5 to 10 g/l.

* This excludes any contamination of the precipitated silver powder with the precipitating agent.

By the addition of small amounts of a flocculating agent before precipitation of the elemental silver, for example 1 to 5 mg of Superfloc (Cyanamide) per liter, the volume of the precipitated silver powder can be sharply increased, e.g. from 5 to 10 times, to facilitate filtering and washing of the precipitate.

The silver precipitate is then washed and can be subjected to after-cleaning as desired and dried so that the silver powder when smelted will have a silver content in excess of 99.98% silver, preferably in excess of 99.99% silver.

From the filtrate from which the silver precipitate is separated, ammonia is released by the addition of a sufficient quantity of calcium hydroxide. The ammonia is then distilled off to recover the major proportion of the ammonia orginally used for recycling to the extractor step. The distillation residue or filter cake is a copper oxychloride contaminated with lime which can be returned to the metallurgical plant for use as a source of lime. The filtrate can be disposed of as runoff without further treatment. The relevant reaction equations are $$Cu(NH_3)^{++} + Cu^o \rightarrow 2Cu(NH_3)_2+$$

$$Cu^+ + 2NH_3 \rightarrow Cu(NH_3)_2+$$

$$Ag(NH_3)_2^+ + Cu(NH_3)_2^+ \rightarrow Cu(NH_3)_4^{++} + Ag^o$$

$$4Cu(NH_3)_4Cl_2 + 3Ca(OH)_2 \rightarrow 3CaCl_2 + 3Cu(OH)_2 \cdot CuCl_2 + 4NH_3$$

The copper$^I$ compounds which can be used can be CuCl, $M^I CuCl_2$ where $M^I$ is hydrogen, sodium or potassium, or $M^{II}(CuCl_2)_2$ where $M^{II}$ is calcium or magnesium.

SPECIFIC EXAMPLE 69.5 kg of anode sludge from copper electrolysis containing about 4% silica, is introduced into a gas-tight reactor (step 1 of the flow diagram) and suspended in dilute hydrochloric acid to a volume of 50 liters. Into this suspension is slowly introduced at room temperature and with stirring a concentrated sodium hypochlorite solution . After about 1½ hours, the suspension is fully chlorinated, the temperature having risen from 22° C. to 35° C.

The reaction mixture is thus filtered (stage 2) in a gas-tight filter press, is thoroughly press, is thoroughly washed and the filtrate, containing all of the gold, palladium, platinum and selenium and the greatest proportion of the tellurium of the anode sludge is subjected to separate processes at 2a to recover these elements by conventional means which are not relevant to the instant invention. A small part of the tellurium remains in the insoluble residue.

The filter cake, containing all of the silver as silver chloride is extracted (stage 3) with ammonia in the form of ammonium hydroxide (10% aqueous ammonia) in stage 3 to which 10 kg of calcium carbonate (chalk) is added as an extracting and filter aid. The extraction is carried out by slurrying the filter cake and the calcium carbonate with the ammonium hydroxide to a volume of 60 liters. The suspension is stirred for 3 hours and the total silver chloride is solubilized as $Ag(NH_3)_2Cl$.

The suspension is then subjected (stage 4) to filtering in a gas-tight filter press and washed well. The filter cake is delivered at 4c to a furnace. The filtrate, about 75 liters following the washing, is reacted by stirring 100 ml of $H_3PO_4$ into it and is then stirred briefly and further filtered (stages 4a and 4b).

Addition of phosphoric acid to the $Ag^+$ solution precipitates the $Pb^{++}$ substantially quantitatively as lead phosphate. This treatment of the $Ag^+$ solution is necessary to achieve silver purities in the product of 99.99% Ag and more.

The relevant reaction is $$3Pb^{++} + 2PO_4^{---} \rightarrow Pb_3(PO_4)_2$$

The silver-containing lead-free filtrate is in stage 5 combined with 200 ml of superfloc in an aqueous solution and reacted with a small excess of a neutral Na-$CuCl_2$ solution, thereby quantitatively precipitating the $Ag^+$ as Ag metal powder.

After filtering, washing, aftercleaning if desired and drying, the silver powder is smelted in a graphite crucible to high purity silver with a silver content of 99.99%.

The filtrate is reacted with about 5 km calcium hydroxide and the free ammonia from stage 7 is distilled off and recycled to stage 3. The filter cake is returned to the metallurgical plant and the final filtrate is disposed of.

We claim:

1. A hydrometallurgical process for the treatment of a copper-electrolysis anode sludge raw material which contains silver, lead and copper, and additionally one or more constituents selected from the group consisting of Au, platinum-group metals, Se, Te, Sb, Sn, As, Bi, Ni, Zn and Fe, sulfate ion, chloride ion and silica, comprising the steps of:
   (a) slurrying said raw material with hydrochloric acid and introducing a sodium hypochlorite solution to the resulting slurry to generate nascent chlorine and chlorinate said raw material therewith;
   (b) filtering said slurry to recover a first filtrate containing soluble chlorides of said constituents and a first solid filtered phase containing the silver of said raw material in the form of precipitated AgCl;

(c) extracting said first solid filtered phase with ammonia to recover an extract containing silver in solution in the form of $Ag(NH_3)_2Cl$ and dissolved lead;

(d) precipitating the lead from said extract and filtering same to form a second filtrate containing the $Ag(NH_3)_2Cl$;

(e) displacing silver from said second filtrate with at least one substance selected from the group consisting of $Cu^I$ compounds, copper powder and bronze dust to precipitate a silver powder at a temperature of at least room temperature and with agitation, and increasing the volume of said silver powder by adding to said second filtrate a flocculating agent;

(f) filtering the second filtrate to recover a silver-powder precipitate and an ammoniacal third filtrate;

(g) reacting said third filtrate with calcium hydroxide to liberate ammonia, and distilling off the liberated ammonia to recover same while producing a suspension of a calcium salt;

(h) filtering said suspension to recover a filter cake; and (i) smelting the silver-powder precipitated recovered in step (f) to obtain a product of enriched silver content relative to said silver-powder.

2. The process defined in claim 1 wherein said first solid filter phase is mixed in a weight ratio of 5:1 with calcium carbonate and extracted in step c with stirring with 10% ammonia solution for a period of 3 to 6 hours.

3. The process defined in claim 1 wherein step e comprises adding to the ammoniacal second filtrate, a neutral, acid or ammoniacal $Cu^I$ solution or copper powder or bronze dust at room temperature to reduce the silver of said second filtrate to metallic silver which is washed and dried before being smelted in step i.

4. The proces defined in claim 3 wherein said $Cu^I$ solution is a solution of CuCl, $M^I CuCl_2$ or $M^{II}(CuCl_2)_2$ wherein $M^I$ is sodium, hydrogen or potassium and $M^{II}$ is calcium or magnesium.

5. The process defined in claim 1 wherein step e is carried out by contacting the second filtrate with a solid form of CuCl, $M^I CuCl_2$ or $M^{II}(CuCl_2)_2$ wherein $M^I$ is sodium, hydrogen or potassium and $M^{II}$ is calcium or magnesium.

6. The process defined in claim 1 further comprising the step of adding to said second filtrate before the precipitation of elemental silver therefrom an effective amount of a flocculating agent to increase the volume of the silver powder precipitate recovered in step (f).

* * * * *